United States Patent
Kim (10) Patent No.: US 6,750,932 B2
(45) Date of Patent: Jun. 15, 2004

(54) TRANSFLECTIVE LIQUID CRYSTAL DISPLAY DEVICE, METHOD OF FABRICATING THE SAME, AND METHOD OF USING THE SAME

(75) Inventor: Wook-Sung Kim, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/268,658

(22) Filed: Oct. 11, 2002

(65) Prior Publication Data

US 2003/0071945 A1 Apr. 17, 2003

(30) Foreign Application Priority Data

Oct. 12, 2001 (KR) .......................... 2001-63140

(51) Int. Cl.$^7$ ............................................ G02F 1/1335
(52) U.S. Cl. ........................ 349/114; 349/113
(58) Field of Search ............................ 349/113, 114

(56) References Cited

FOREIGN PATENT DOCUMENTS

| KR | 1993-0003809 | 11/1993 |
|---|---|---|
| KR | 2001-0072492 | 7/2001 |

*Primary Examiner*—Robert H. Kim
*Assistant Examiner*—George Y. Wang
(74) *Attorney, Agent, or Firm*—Morgan Lewis & Bockius LLP (57) ABSTRACT

A transflective liquid crystal display device includes a liquid crystal panel having a pixel electrode, wherein the pixel electrode includes a first reflective region and a first transmissive region, a patterned reflective panel adjacent to the liquid crystal panel, the patterned reflective panel having a second reflective region and a second transmissive region, and a back light unit adjacent to the patterned reflective panel, wherein the patterned reflective panel is movable along a direction parallel to the liquid crystal panel.

24 Claims, 7 Drawing Sheets

TRANSFLECTIVE LIQUID CRYSTAL DISPLAY DEVICE, METHOD OF FABRICATING THE SAME, AND METHOD OF USING THE SAME

The present invention claims the benefit of Korean Patent Application No. 2001-63140, filed in Korea on Oct. 12, 2001, which is hereby incorporated by reference in its entirety.

BACKGROUND OF THE INVENTION

1. Field of the Invention

The present invention relates to a liquid crystal display (LCD) device and more particularly, to a transflective liquid crystal display (LCD) device that is used both in a transmissive mode and in a reflective mode.

2. Discussion of the Related Art

In general, a liquid crystal display (LCD) device includes two substrates spaced apart and facing each other, and a liquid crystal material layer interposed between the two substrates. Each of the first and second substrates includes an electrode, whereby the electrodes of each of the first and second substrates face each other. When a voltage is applied to each of the electrodes, an electric field is induced between the electrodes. Accordingly, an alignment of the liquid crystal molecules of the liquid crystal material layer is changed by the varying intensity or direction of the induced electric field. Thus, the LCD device displays an image by varying transmittance of light through the liquid crystal material layer according to the arrangement of the liquid crystal molecules. However, since the liquid crystal display (LCD) device is not luminescent, an additional light source is required to display images.

The liquid crystal display device may be categorized into two different types depending upon the type of light source used; a transmissive type and a reflective type. In the transmissive type, a back light is positioned behind a liquid crystal panel, wherein light incident from the back light enters into the liquid crystal panel. Accordingly, an amount of light transmitted through the liquid crystal material layer is controlled by the alignment of the liquid crystal molecules. Thus, the substrates and the electrodes must be formed of transparent conductive materials. Since the transmissive liquid crystal display (LCD) device uses the back light as a light source, it can display bright images in dark surroundings. In addition, the light intensity of the back light must be increased since the amount of transmitted light is relatively small. Consequently, the transmissive liquid crystal display (LCD) device requires a relatively high power consumption due to the low light intensity of the back light.

In the reflective type LCD device, ambient sunlight or artificial light is used as a light source of the LCD device. The ambient light incident from the surroundings is reflected by a reflective plate of the LCD device according to the arrangement of the liquid crystal molecules. Since there is no back light, the reflective type LCD device has considerably lower power consumption than the transmissive type LCD device. However, the reflective type LCD device may not be suitable for use in places with low ambient light since an artificial light source would be required.

Figure 1:
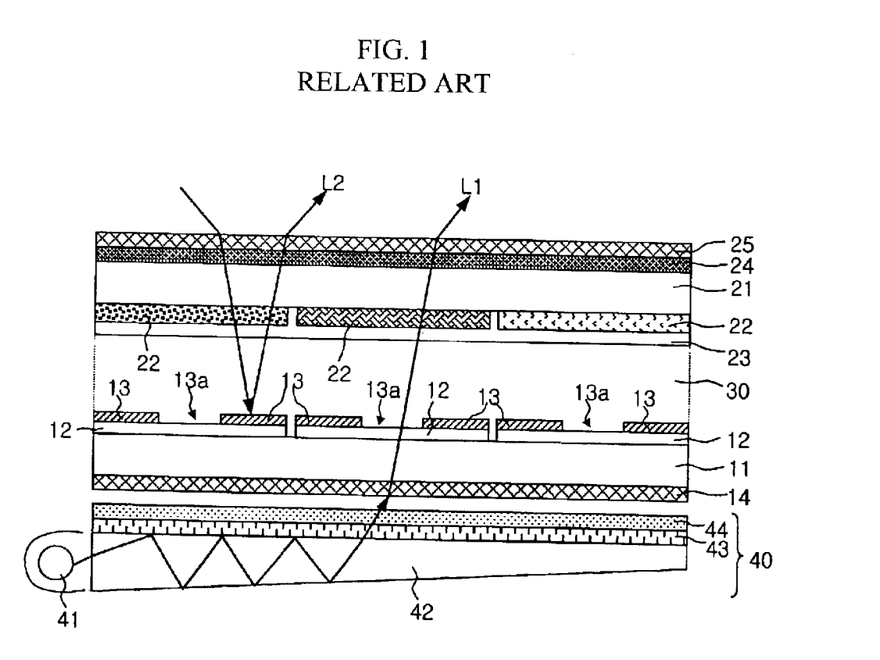
FIG. 1 is a cross-sectional view of a transflective LCD device according to the related art.

FIG. 1 is a cross-sectional view of a transflective LCD device according to the related art. In FIG. 1, transmissive electrodes 12 are formed along an inner surface of a first substrate 11 that includes a thin film transistor (not shown) electrically connected to each of the transmissive electrodes 12. Reflective electrodes 13 are formed on the transmissive electrodes 12, and each has a transmissive hole 13a exposing a portion of the transmissive electrode 12. A first polarizer 14 is arranged along an outer surface of the first substrate 11, thereby linearly polarizing incident light.

A second substrate 21 is spaced apart from and faces the first substrate 11, and a color filter layer 22 is formed on an inner surface of the second substrate 21. The color filter layer 22 is composed of three sub-color filters of red (R), green (G), and blue (B). Each of the sub-color filters correspond to each of the transmissive electrodes 12. A common electrode 23 is formed on the color filter layer 22, and is made of a conductive transparent material. A diffusing film 24 and a second polarizer 25 are subsequently arranged along an outer surface of the second substrate 21, wherein a transmission axis of the second polarizer 25 is perpendicular to a transmission axis of the first polarizer 14. A liquid crystal material layer 30 is disposed between the reflective electrodes 13 and the common electrode 23.

In FIG. 1, a back light unit 40 is disposed beneath the first polarizer 14, and is used as a light source during a transmissive mode of the transflective LCD device. The back light unit 40 includes a light guide panel 42, a lamp 41, a collimating sheet 43, and a diffusing sheet 44. The light guide panel 42 includes scattering patterns formed along a lower surface, thereby changing linear light of the lamp 41 into plane light.

In a transmissive mode, a first light "L1" generated from the back light unit 40 penetrates into the first polarizer 14 and through the first substrate 11. In addition, the first light "L1" passes through the portion of the transmissive electrode 12 that corresponds to the transmissive hole 13a and through the liquid crystal material layer 30. Then, the first light "L1" is transmitted through the common electrode 23, the color filter layer 22, the second substrate 21, the diffusing film 24, and the second polarizer 25.

In a reflective mode, a second light "L2" incident from ambient surroundings, such as sunlight or artificial light, passes through the second polarizer 25, the diffusing film 24, the second substrate 21, the color filter 22, the common electrode 23, and the liquid crystal material layer 30. Then, the second light "L2" is reflected by the reflective electrode 13 and is transmitted back through the liquid crystal material layer 30, the common electrode 23, the color filter 22, the second substrate 21, the diffusing film 24, and the second polarizer 25.

By comparison, the transflective LCD device has lower reflectance than the reflective LCD device because of the transmissive hole 13a formed in the reflective electrode 13. Specifically, in the reflective mode, light incident toward the transmissive hole 13a is transmitted to the back light unit 40 and is not reflected. In addition, the transflective LCD device has lower brightness than the transmissive LCD device in the transmissive mode since light incident toward the reflective electrode 13 from the back light unit 40 is reflected toward the back light unit 40.

SUMMARY OF THE INVENTION

Accordingly, the present invention is directed to a transflective liquid crystal display (LCD) device that substantially obviates one or more of problems due to limitations and disadvantages of the related art.

An object of the present invention is to provide a transflective liquid crystal display (LCD) device that improves brightness both in a transmissive mode and in a reflective mode.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transflective liquid crystal display device includes a liquid crystal panel having a pixel electrode, wherein the pixel electrode includes a first reflective region and a first transmissive region, a patterned reflective panel adjacent to the liquid crystal panel, the patterned reflective panel having a second reflective region and a second transmissive region, and a back light unit adjacent to the patterned reflective panel, wherein the patterned reflective panel is movable along a direction parallel to the liquid crystal panel.

In another aspect, a transflective liquid crystal display device includes first and second substrates spaced apart and facing each other, a thin film transistor on an inner surface of the first substrate, a first passivation layer on the thin film transistor and having a first transmissive hole, a transmissive electrode on the first passivation layer and electrically connected to the thin film transistor, a second passivation layer on the transmissive electrode, a reflector on the second passivation layer and having a second transmissive hole aligned with the first transmissive hole, the second transmissive hole defining a first transmissive region and a first reflective region, a color filter layer on an inner surface of the second substrate, a common electrode on the color filter layer, a liquid crystal material layer between the reflector and the common electrode, a first polarizer on an outer surface of the first substrate, a patterned reflective panel over the first polarizer, the patterned reflective panel having a second transmissive region and a second reflective region, a back light unit over the patterned reflective panel, a diffusing film on an outer surface of the second substrate, and a second polarizer on the diffusing film, wherein the patterned reflective panel is movable along a direction parallel to the first and second substrates.

In another aspect, a method of fabricating a transflective liquid crystal display device includes forming a pixel electrode on a liquid crystal panel, wherein the pixel electrode includes a first reflective region and a first transmissive region, forming a patterned reflective panel adjacent to the liquid crystal panel, the patterned reflective panel having a second reflective region and a second transmissive region, and arranging a back light unit adjacent to the patterned reflective panel, wherein the patterned reflective panel is movable along a direction parallel to the liquid crystal panel.

In another aspect, a method for changing an operational mode of a transflective liquid crystal display device includes moving a patterned reflective panel along a direction parallel to an adjacent liquid crystal panel, wherein the liquid crystal panel includes a pixel electrode having a first reflective region and a first transmissive region, and the patterned reflective panel includes a second reflective region and a second transmissive region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiment of the present invention, examples of which are illustrated in the accompanying drawings.

Figure 2:
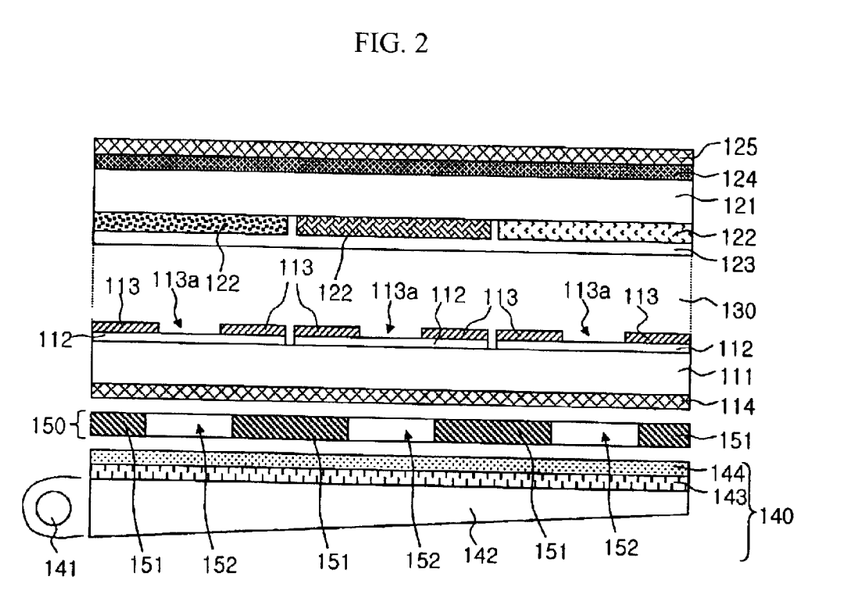
FIG. 2 is a cross-sectional view of an exemplary transflective LCD device according to the present invention.

FIG. 2 is a cross-sectional view of an exemplary transflective LCD device according to the present invention. In FIG. 2, a transflective LCD device may have a first substrate 111 and a second substrate 121, wherein the first and second substrates 111 and 121 are spaced apart and face each other. Transmissive electrodes 112 may be formed along an inner surface of the first substrate 111, which may include a thin film transistor (not shown) electrically connected to each of the transmissive electrodes 112. The transmissive electrodes 112 may be made of a conductive transparent material having a relatively high transmittance. Reflective electrodes 113 may be formed on each of the transmissive electrodes 112, wherein each of the reflective electrodes 113 may include a transmissive hole 113a exposing a portion of the transmissive electrode 112. The reflective electrode 113 may be made of an conductive opaque material having a relatively high reflectance and a relatively low resistivity. Although the reflective electrodes 113 may be connected to the transmissive electrodes 112, an insulating layer (not shown) may be positioned between the reflective electrodes 113 and the underlying transmissive electrodes 112. In addition, the transmissive electrodes 112 may be formed over the reflective electrodes 113.

A first polarizer 114 may be arranged along an outer surface of the first substrate 111, thereby linearly polarizing any incident light. A patterned reflective panel 150 may be arranged between the first polarizer 114 and a light source 140. The patterned reflective panel 150 may include a reflective portion 151 formed of a blocking layer and a transmissive portion 152 formed of a transparent substrate. Accordingly, the reflective portion 151 and the transmissive portion 152 may be larger than the transmissive hole 113a. The patterned reflective panel 150 may be able to move horizontally along right and left directions or along front and rear directions. The movement of the patterned reflective panel 150 may be performed in a manual mode or may be performed in an automatic mode. In either mode, the movement of the patterned reflective panel 150 may be positioned to provide a desired image intensity. Accordingly, light may be reflected both at upper surfaces and lower surfaces of the reflective portions 151 of the patterned reflective panel 150.

A color filter layer 122 may be formed along an inner surface of the second substrate 121, and may include three sub-color filters of red (R), green (G), and blue (B). Each of the sub-color filters 122 may correspond to each of the transmissive electrodes 112. In addition, a common electrode 123 may be formed on the color filter layer 122, and may be made of the same conductive transparent material as the transmissive electrodes 112. Alternatively, the common electrode 123 and the transmissive electrodes 112 may be made of different conductive transparent materials.

A diffusing film 124 and a second polarizer 125 may be arranged along an outer surface of the second substrate 121 and may function as an analyzer, wherein a transmission axis of the second polarizer 125 may have an angle of about 90 degrees with a transmission axis of the first polarizer 114.

A liquid crystal material layer 130 may be disposed between the reflective electrode 113 and the common electrode 123. In addition, alignment layers may be formed on the reflective electrodes 113 and the common electrode 123. Accordingly, molecules of the liquid crystal material layer 130 may be arranged horizontally with respect to the first and second substrates 111 and 121 according to the alignment layers.

The back light unit 140 may be used as a light source in a transmissive mode in the transflective LCD device. The back light unit 140 may include a light guide panel 142, a lamp 141 located at a side portion of the light guide panel 142, a collimating sheet 143, and a diffusing sheet 144 positioned over the light guide 142. The light guide panel 142 may include scattering patterns (not shown) formed along the lower surface, thereby changing linear light emitted from the lamp 141 into plane light. The scattering patterns (not shown) may be formed by an etching or printing method, for example. Alternatively, the lower surface of the light guide panel may include multiple regions of variable thickness instead of, or in addition to the scattering patterns. A reflector (not shown) may be arranged beneath the light guide panel 142 to prevent light leakage.

Figure 3:
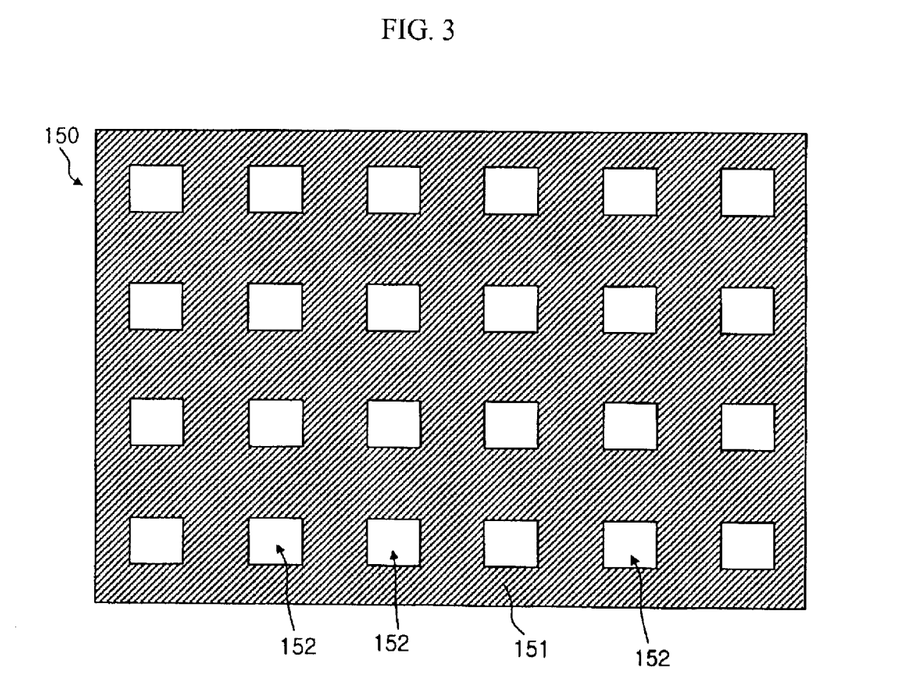
FIG. 3 is a plan view of an exemplary patterned reflective panel according to the present invention.

FIG. 3 is a plan view of an exemplary patterned reflective panel according to the present invention. In FIG. 3, the patterned reflective panel 150 may include the reflective portions 151 and the transmissive portions 152. The patterned reflective panel 150 may be made of a transparent substrate, whereby a blocking layer is positioned upon the transparent substrate to have a plurality of openings. For example, the blocking layer may correspond to the reflective portions 151 and the openings may correspond to the transmissive portions 152. Although the transmissive portions 152 are shown having a square shape, other geometries may be implemented. For example, rectangular, circular, and hexagonal geometries may be used to form the transmissive portions 152 of the patterned reflective panel 150.

Figure 4:
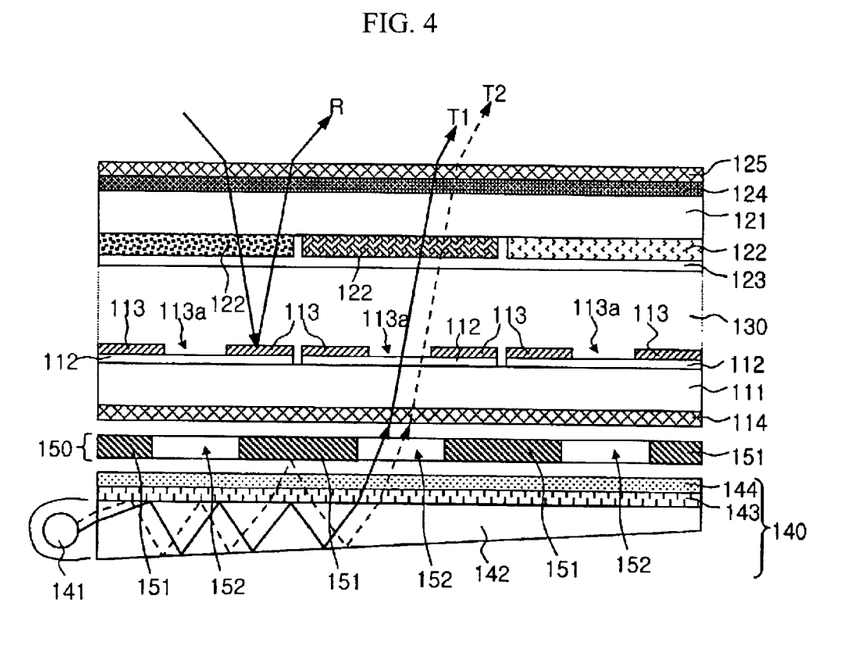
FIG. 4 is a cross-sectional view of an exemplary transflective LCD device in a transmissive mode according to the present invention.

FIG. 4 is a cross-sectional view of an exemplary transflective LCD device in a transmissive mode according to the present invention. In FIG. 4, the transmissive portion 152 of the patterned reflective panel 150 coincides with the transmissive hole 113a. Accordingly, light emitted from the back light unit 140 may pass through the transmissive portion 152 of the patterned reflective panel 150 and may be linearly polarized by the first polarizer 114. Then, the linearly polarized light may pass through the first substrate 111 and the portion of the transmissive electrode 122 that corresponds to the transmissive hole 113a, and may enter into the liquid crystal material layer 130. Accordingly, transmission of the light may be controlled according to an arrangement of liquid crystal molecules. Finally, a first transmitted light "T1" may be transmitted through the common electrode 123, the color filter layer 122, the second substrate 121, the diffusing film 124, and the second polarizer 125.

Light emitted from the back light unit 140 and incident upon the reflective portion 151 of the patterned reflective panel 150 may be reflected at the reflective portion 151 of the patterned reflective panel 150, and may return back to the back light unit 140. Subsequently, a portion of the light may be reflected to the back light unit 140 and pass through the transmissive portion 152 of the patterned reflective panel 150. Thus, a second transmitted light "T2" may be transmitted through a same path as the first transmitted light "T1."

Conversely, ambient light such as sunlight or artificial light may sequentially pass through the second polarizer 125, the diffusing film 124, the second substrate 121, the color filter layer 122, the common electrode 123, and the liquid crystal material layer 130. Accordingly, the light may be reflected by the reflective electrode 113 and retransmitted back through the liquid crystal material layer 130, the common electrode 123, the color filter layer 122, the second substrate 121, the diffusing film 124, and the second polarizer 125, and emerge as a reflected light "R.". Thus, since a total amount of transmitted light increases due to the patterned reflective panel 150 and the additional reflected light "R," the transflective LCD device may have a relatively higher brightness in the transmissive mode.

Figure 5:
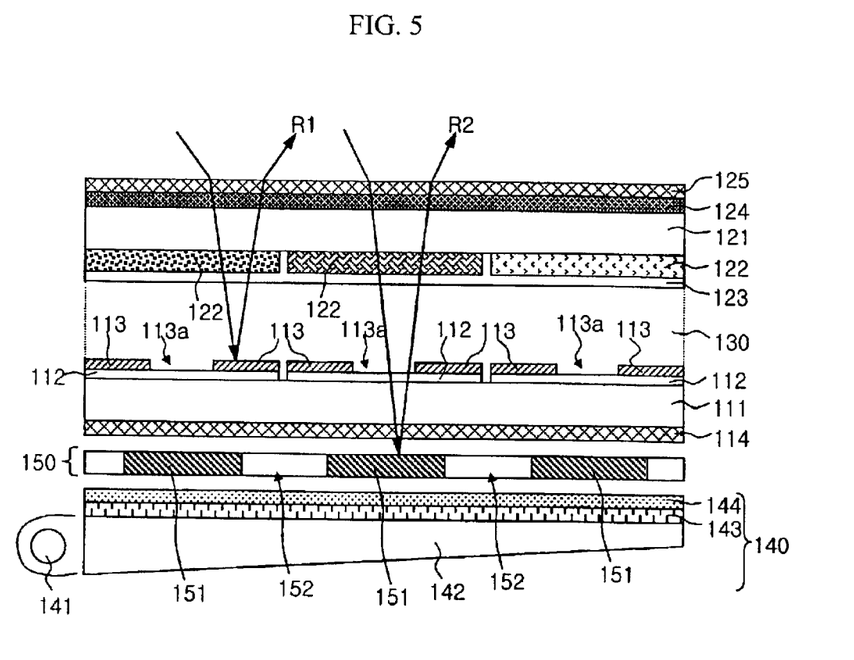
FIG. 5 is a cross-sectional view of an exemplary transflective LCD device in a reflective mode according to the present invention.

FIG. 5 is a cross-sectional view of an exemplary transflective LCD device in a reflective mode according to the present invention. In FIG. 5, the reflective portion 151 of the patterned reflective panel 150 corresponds to the transmissive hole 113. Accordingly, ambient light such as sunlight or artificial light may pass through the second polarizer 125, thereby linearly polarizing the ambient light. The linearly polarized light may pass through the diffusing film 124, the second substrate 121, the color filter layer 122, and the common electrode 123, and into the liquid crystal material layer 130. Thus, the alignment of the liquid crystal molecules may control the transmission of the linearly polarized light. Next, the light may be reflected by the reflective electrode 113 and again pass through the liquid crystal material layer 130. Subsequently, the light may be retransmitted through the common electrode 123, the color filter layer 122, the second substrate 121, the diffusing film 124, and the second polarizer 125, and emerge as a first reflected light "R1."

Conversely, a portion of ambient light may pass through the second polarizer 125, the diffusing film 124, the second substrate 121, the color filter layer 122, the common electrode 123, and the liquid crystal material layer 130. Then, the light may pass through the transmissive hole 113a, the transmissive electrode 112, the first substrate 111, and the first polarizer 114, and may be reflected by the reflective portion 151 of the patterned reflective panel 150. Accordingly, the light may be retransmitted through the first polarizer 114, the first substrate 111, the transmissive electrode, the transmissive hole 113a, the liquid cystal material layer 130, the common electrode 123, the colot filter layer 122, the second substrate 121, the diffusing film 124, and the second polarizer 125 to emerge as a second reflected light "R2." Thus, in the reflective mode of the transflective LCD device, a loss of light is prevented due to the reflective portion 151 of the patterned reflective panel 150, and the brightness of the transflective LCD device increases.

Figure 6:
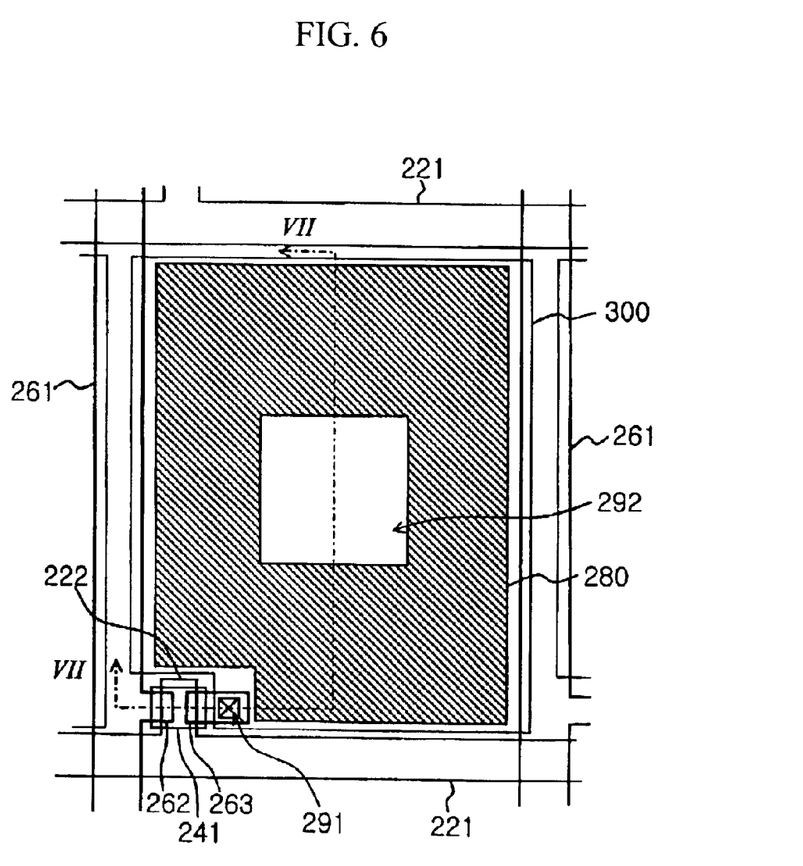
FIG. 6 is a plan view of an exemplary array substrate for a transflective LCD device according to the present invention.
Figure 7:
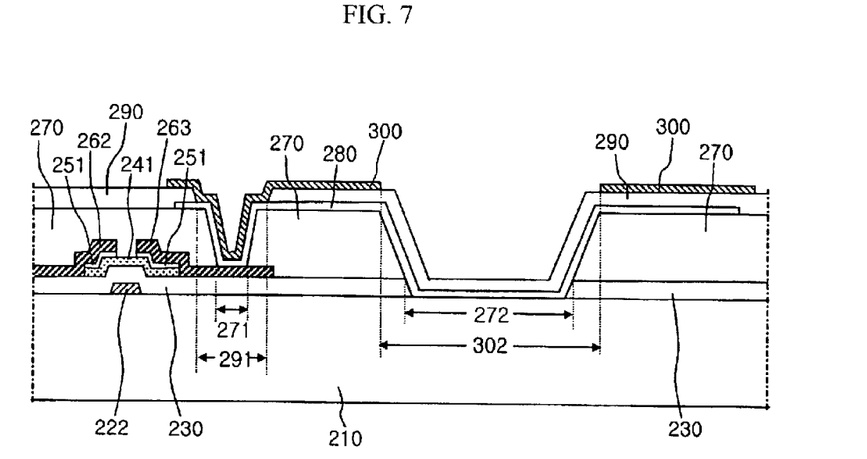
FIG. 7 is a cross-sectional view of the exemplary array substrate along VII—VII of FIG. 6 according to the present invention.

FIG. 6 is a plan view of an exemplary array substrate for a transflective LCD device according to the present invention, and FIG. 7 is a cross-sectional view of the exemplary array substrate along VII—VII of FIG. 6 according to the present invention. In FIGS. 6 and 7, a gate electrode 222 may be formed on a transparent substrate 210, and may be connected to a gate line 221 that extends along a horizontal direction. The transparent substrate 210 may be made of an insulating material such as glass, and the gate electrode 222 and the gate line 221 may be formed of a conducting material such as a metal. A gate insulator 230 may cover the gate electrode 222 and the gate line 221, and may be made of silicon nitride (SiNx) or silicon oxide (SiO$_2$), for example.

An active layer 241 and an ohmic contact layer 251 may be subsequently formed on the gate insulator 230, wherein the active layer 241 may be made of amorphous silicon, for example, and the ohmic contact layer 251 may be made of doped amorphous silicon, for example. Next, source and drain electrodes 262 and 263 may be formed on the ohmic contact layer 251, wherein the source electrode 262 may be connected to a data line 261 that extends along a vertical direction perpendicular to the horizontal direction. The data line 261 may cross the gate line 221, thereby defining a pixel region. The ohmic contact layer 251 may lower a contact resistance between the active layer 241 and the source and drain electrodes 262 and 263.

A first passivation layer 270 may cover the data line 261 and the source and drain electrodes 262 and 263, and may include a first contact hole 271 and a first transmissive hole 272. The first passivation layer 270 may be made of a benzocyclobutene (BCB) or a photosensitive acrylic resin, for example. The first contact hole 271 may expose a portion of the drain electrode 263 and the first transmissive hole 272 may expose a portion of the transparent substrate 210 through the gate insulator 230. Alternatively, the gate insulator 230 may be not etched such that the first transmissive hole 272 may be formed only through the first passivation layer 270. The first transmissive hole 272 may result in increasing a thickness of a liquid crystal material layer (not shown) in a transmissive region. Accordingly, a thickness of the liquid crystal material layer in a reflective region may be relatively thinner, thereby optimizing an optical characteristic of a transmissive mode with an optical characteristic of a reflective mode, simultaneously.

A transmissive electrode 280 may be formed on the first passivation layer 270, and positioned in the pixel region. The transmissive electrode 280 may be connected to the drain electrode 263 through the first contact hole 271. The transmissive electrode 280 may be made of a conductive transparent material such as indium-tin-oxide (ITO) and indium-zinc-oxide (IZO), for example.

A second passivation layer 290 may be formed on the transmissive electrode 280, and may include a second contact hole 291 that exposes a portion of the transparent electrode 270 that corresponds to the first contact hole 271. The second passivation layer 290 may be made of silicon nitride (SiNx) and silicon oxide (SiO$_2$), for example.

A reflective electrode 300 may be formed on the second passivation layer 290, and may be connected to the transmissive electrode 280 through the second contact hole 291, thereby functioning as a reflector. Alternatively, the reflective electrode 300 may be formed beneath the transmissive electrode 280 and may not be connected to the transmissive electrode 280. The reflector 300 may include a second transmissive hole 302 that exposes a portion of the transmissive electrode 280 that corresponds to the first transmissive hole 272.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A transflective liquid crystal display device, comprising:
   a liquid crystal panel having a pixel electrode, the pixel electrode including a first reflective region and a first transmissive region;
   a patterned reflective panel adjacent to the liquid crystal panel, the patterned reflective panel having a second reflective region and a second transmissive region; and
   a back light unit adjacent to the patterned reflective panel,
   wherein the patterned reflective panel is movable along a direction parallel to the liquid crystal panel.

2. The device according to claim 1, wherein the pixel electrode is aligned with the second reflective region and the second transmissive region.

3. The device according to claim 2, wherein the second reflective region has an area larger than the first transmissive region.

4. The device according to claim 2, wherein the second transmissive region has an area larger than the first transmissive region.

5. The device according to claim 2, wherein the first reflective region overlaps the second reflective region and the first transmissive region overlaps the second transmissive region.

6. The device according to claim 2, wherein the first reflective region overlaps the second transmissive region and the first transmissive region overlaps the second reflective region.

7. The device according to claim 1, wherein the liquid crystal panel includes an array substrate having a thin film transistor, a transmissive electrode and a reflector having a transmissive hole, and a color filter substrate having a color filter and a common electrode.

8. The device according to claim 7, wherein the transmissive hole is aligned with the first transmissive region.

9. The device according to claim 7, wherein the reflector is electrically connected to the transmissive electrode.

10. A method of fabricating a transflective liquid crystal display device, comprising:
    forming a pixel electrode on a liquid crystal panel, the pixel electrode including a first reflective region and a first transmissive region;
    forming a patterned reflective panel adjacent to the liquid crystal panel, the patterned reflective panel having a second reflective region and a second transmissive region; and
    arranging a back light unit adjacent to the patterned reflective panel,
    wherein the patterned reflective panel is movable along a direction parallel to the liquid crystal panel.

11. The method according to claim 10, wherein the pixel electrode is aligned with the second reflective region and the second transmissive region.

12. The method according to claim 11, wherein the second reflective region has an area larger than the first transmissive region.

13. The method according to claim 11, wherein the second transmissive region has an area larger than the first transmissive region.

14. The method according to claim 11, wherein the first reflective region overlaps the second reflective region and the first transmissive region overlaps the second transmissive region.

15. The method according to claim 11, wherein the first reflective region overlaps the second transmissive region and the first transmissive region overlaps the second reflective region.

16. The method according to claim 10, wherein the liquid crystal panel includes an array substrate having a thin film transistor, a transmissive electrode and a reflector having a transmissive hole, and a color filter substrate having a color filter and a common electrode.

17. The method according to claim 16, wherein the transmissive hole is aligned with the first transmissive region.

18. The method according to claim 16, wherein the reflector is electrically connected to the transmissive electrode.

19. A method for changing an operational mode of a transflective liquid crystal display device, comprising:
moving a patterned reflective panel along a direction parallel to an adjacent liquid crystal panel,
wherein the liquid crystal panel includes a pixel electrode having a first reflective region and a first transmissive region, and the patterned reflective panel includes a second reflective region and a second transmissive region.

20. The method according to claim 19, wherein the first reflective region overlaps the second reflective region and the first transmissive region overlaps the second transmissive region in a transmissive operational mode.

21. The method according to claim 19, wherein the first reflective region overlaps the second transmissive region and the first transmissive region overlaps the second reflective region in a reflective operational mode.

22. The method according to claim 19, wherein the liquid crystal panel includes an array substrate having a thin film transistor, a transmissive electrode and a reflector having a transmissive hole, and a color filter substrate having a color filter and a common electrode.

23. The method according to claim 22, wherein the transmissive hole is aligned with the first transmissive region.

24. The method according to claim 19, wherein the reflector is electrically connected to the transmissive electrode.

* * * * *